United States Patent
Garcia Ramirez et al.

(10) Patent No.: US 11,821,532 B1
(45) Date of Patent: Nov. 21, 2023

(54) VEHICLE VENT SYSTEM

(71) Applicant: Ford Global Technologies, LLC, Dearborn, MI (US)

(72) Inventors: Arturo Alberto Garcia Ramirez, Mexico City (MX); Ricardo Daniel Sanchez Lugo, Texcoco (MX); Luis Felipe Blas Martinez, Jilotepec (MX); Oscar Saavedra Zavala, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/893,584

(22) Filed: Aug. 23, 2022

(51) Int. Cl.
*F16K 24/04* (2006.01)
*F16H 57/027* (2012.01)

(52) U.S. Cl.
CPC .......... *F16K 24/04* (2013.01); *F16H 57/027* (2013.01); *Y10T 137/3084* (2015.04)

(58) Field of Classification Search
CPC ......... F16H 57/027; F16K 24/04; F16K 24/06
See application file for complete search history.

(56) References Cited

U.S. PATENT DOCUMENTS

| | | | |
|---|---|---|---|
| 4,147,096 A * | 4/1979 | Caswell | F16K 24/04 137/533.27 |
| 6,409,591 B1 | 6/2002 | Sullivan et al. | |
| 6,447,565 B1 | 9/2002 | Raszkowski et al. | |
| 6,904,931 B2 * | 6/2005 | Stephens | D06F 39/083 137/218 |
| 8,430,114 B2 | 4/2013 | Welch et al. | |
| 10,371,246 B2 * | 8/2019 | Frerichs | B01D 45/16 |
| 10,948,068 B2 | 3/2021 | Tesner et al. | |
| 2002/0025854 A1 | 2/2002 | Miller et al. | |
| 2003/0047024 A1 | 3/2003 | Kaplan et al. | |
| 2003/0057048 A1 | 3/2003 | Kuczera | |
| 2007/0170186 A1 | 7/2007 | Bertani | |
| 2008/0156374 A1 | 7/2008 | Nakano et al. | |
| 2011/0173935 A1 | 7/2011 | Tesner et al. | |
| 2017/0259896 A1 | 9/2017 | Davis et al. | |
| 2017/0299046 A1 | 10/2017 | Reth et al. | |
| 2019/0345870 A1 | 11/2019 | Davis et al. | |

FOREIGN PATENT DOCUMENTS

| | | | | |
|---|---|---|---|---|
| CN | 108119637 A | * | 6/2018 | .......... F16H 57/027 |
| JP | 2002106687 A | * | 4/2002 | .......... F16H 57/027 |

* cited by examiner

*Primary Examiner* — Hailey K. Do
(74) *Attorney, Agent, or Firm* — Burris Law, PLLC

(57) ABSTRACT

A vent device for a vehicle component includes a main body and a cap. The main body includes a central tube and an outer wall. The central tube defines a main vent passage about a central axis. The outer wall is disposed about the tube and cooperates therewith to define a drain passage. The main body defines an outlet of the drain passage open to an exterior. The cap cooperates with the top of the main body to define a vent chamber. The cap and a top portion of the central tube cooperate to define an upper vent passage in fluid communication with the vent chamber, the drain passage, and an outlet of the main vent passage. A bottom portion of the cap at least partially defines a vent outlet radially outward of the drain passage and open to the vent chamber and an exterior of the vent device.

19 Claims, 4 Drawing Sheets

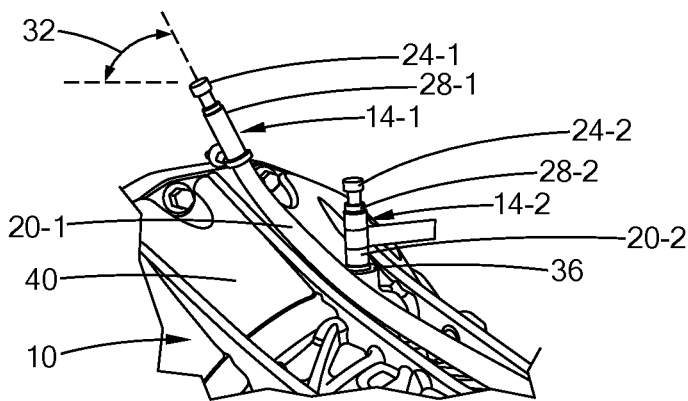
FIG. 1
[PRIOR ART]
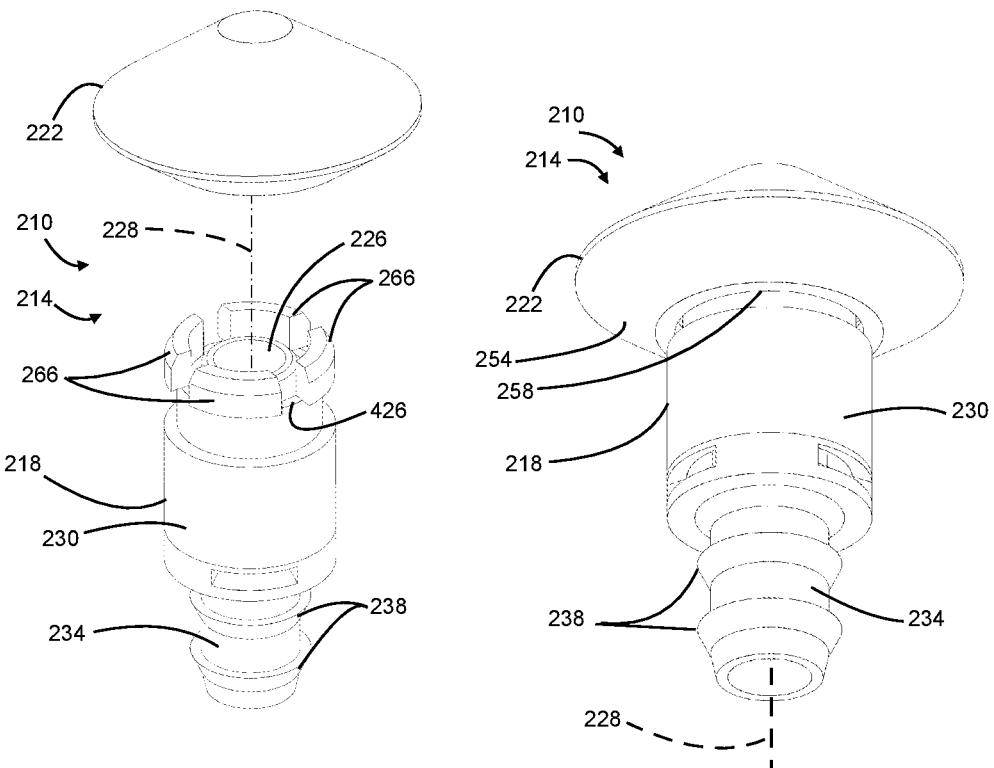
FIG. 2
FIG. 3

VEHICLE VENT SYSTEM

FIELD

The present disclosure relates to a vehicle vent system.

BACKGROUND

The statements in this section merely provide background information related to the present disclosure and may not constitute prior art.

Many vehicle systems require ventilation of air to inhibit build up of pressure within a component. For example, the pressure can build up within the transmission of a vehicle. Typically, a vent tube that allows air to flow in and out of the transmission case is used so that pressure does not build up within the transmission. In some circumstances, water can splash toward the end of the vent tube. As such, typical vent tubes include a plug in the end of the tube that is configured to permit airflow while inhibiting water and debris ingress into the vent tube. However, under some conditions, typical vent tube plugs can still suffer from water ingress due to splashing, which can be undesirable. It can be difficult to inhibit water and debris ingress while permitting efficient airflow therethrough.

The teachings of the present disclosure provide for a vent system that addresses these and other problems with typical vent systems.

SUMMARY

This section provides a general summary of the disclosure and is not a comprehensive disclosure of its full scope or all of its features.

In one form, the present disclosure provides for a vent device for venting a gas from a vehicle component. The vent device includes a main body and a cap. The main body includes a central tube and an outer wall. The central tube defines a main vent passage disposed about a central axis. The outer wall is disposed about the central tube and cooperates with the central tube to define a drain passage radially therebetween. The main body defines at least one drain outlet open to an exterior of the main body and open to a bottom of the drain passage. The cap is coupled to a top of the main body and cooperates with the main body to define a vent chamber. The cap and a top portion of the central tube cooperate to define an upper vent passage. The upper vent passage is in fluid communication with the vent chamber, the drain passage, and an outlet of the main vent passage. A bottom portion of the cap at least partially defines a vent outlet radially outward of the drain passage. The vent outlet is open to the vent chamber and an exterior of the vent device.

According to a variety of alternative forms, which may be included individually or in any combination thereof with the vent device: the main body includes a lower tube defining a lower vent passage in fluid communication with an inlet of the main vent passage, wherein an outer surface of the lower tube defines at least one barb configured to permit the lower tube to be inserted into a hose while inhibiting removal of the lower tube from the hose; a top portion of the cap tapers radially inward relative to the central axis with increased axial distance from the main body; the top portion of the cap is conical or frustoconical in shape and coaxial with the central axis; a bottom portion of the cap is frustoconical in shape and coaxial with the central axis, the frustoconical shape of the bottom portion tapering radially inward with increased axial distance from the top portion of the cap; a bottom portion of the cap tapers radially inward relative to the central axis with increased axial distance from the top portion of the cap; the outer wall includes an upper portion and a lower portion, the upper portion of the outer wall cooperating with the central tube to define an upper region of the drain passage, the lower portion of the outer wall cooperating with the central tube to define a lower region of the drain passage, the lower region extending radially outward of the upper region; the outer wall includes an upper portion and a lower portion, the upper portion cooperating with the cap to define the vent outlet, wherein an outer surface of the lower portion is radially outward of the vent outlet; the vent chamber extends radially outward of vent outlet; the cap includes a vent deflector that has a deflector surface that faces toward the outlet of the main vent passage, wherein, with increased radial distance from the central axis, the deflector surface extends further in an axial direction toward the outlet of the main vent passage, wherein the deflector surface extends radially outward of at least part of the top portion of the central tube to cooperate with the top portion of the central tube to define the upper vent passage; a top of the vent chamber extends above an outlet of the upper vent passage; an inlet of the drain passage is axially below an outlet of the upper vent passage; main body includes a plurality of fingers, each finger having a ramp side and a retention side, the ramp side being configured to guide the finger into the vent chamber by pressing the cap axially toward the main body and the retention side being configured to inhibit removal of the finger from the vent chamber; the at least one drain outlet includes a plurality of drain outlets; the plurality of drain outlets are symmetrically distributed in a circumferential direction about the central axis; each drain outlet of the at least one drain outlets is angled downward and radially outward.

In another form, the present disclosure provides for a vent device for venting a gas from a vehicle component. The vent device includes a main body and a cap. The main body includes a central tube and an outer tube. The central tube defines a main vent passage disposed about a central axis. The outer tube is disposed coaxially about the central tube and cooperates with the central tube to define an annular drain passage radially therebetween. The main body defines at least one drain outlet open to an exterior of the main body and open to a bottom of the drain passage. The cap is coupled to a top of the main body and cooperates with the main body to define a vent chamber. The cap and a top portion of the central tube cooperate to define an upper vent passage in fluid communication with the vent chamber, the drain passage, and an outlet of the main vent passage. A bottom portion of the cap at least partially defines a vent outlet radially outward of the drain passage. The vent outlet is open to the vent chamber and an exterior of the vent device.

According to a variety of alternative forms, which may be included individually or in any combination thereof with the vent device: the outer wall includes an upper portion and a lower portion, the upper portion cooperating with the cap to define the vent outlet, wherein an outer surface of the lower portion is radially outward of the vent outlet; the vent chamber extends radially outward of vent outlet; the cap includes a vent deflector that has a deflector surface that faces toward the outlet of the main vent passage, wherein, with increased radial distance from the central axis, the deflector surface extends further in an axial direction toward the outlet of the main vent passage, wherein the deflector surface extends radially outward of at least part of the top portion of the central tube to cooperate with the top portion of the central tube to define the upper vent passage, wherein a top of the vent chamber extends above an outlet of the upper vent passage.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view of a typical vent system for a vehicle component;

FIG. 2 is an exploded perspective view of a vent system in accordance with the teachings of the present disclosure;

FIG. 3 is a perspective view of the vent system of FIG. 2;

Figure 4:
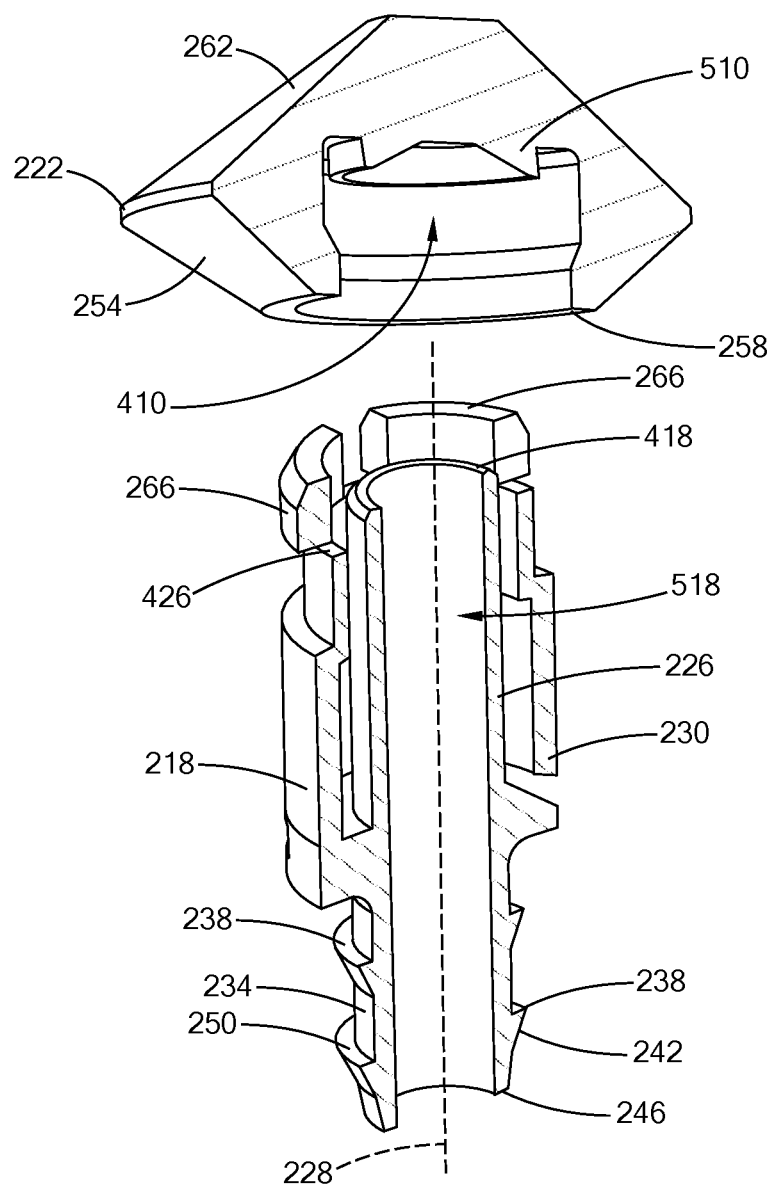
FIG. 4 is an exploded cross-sectional perspective view of the vent system of FIG. 2, taken along a central axis of the vent system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle component 10 is illustrated with a pair of vent systems 14-1 and 14-2. In the example provided, the vehicle component 10 is a transmission for a vehicle's powertrain, though the vent systems of the teachings of the present disclosure may be used to vent other types of vehicle components, such as, but not limited to, a transfer case, a differential, a vehicle battery pack, or a housing that contains circuitry, for example. Additionally, the vent systems of the teachings of the present disclosure may be used to vent components not associated with vehicles, such as power generators or machinery, for example.

Each vent system 14-1, 14-2 includes a hose 20-1, 20-2 and a vent plug 24-1, 24-2 disposed in an end 28-1, 28-2 of the hose 20-1, 20-2. The hose 20-1, 20-2 can be a flexible hose or a rigid tube. The end 28-1, 28-2 of the hose 20-1, 20-2 is oriented such that it opens primarily vertically. In the example provided, the end 28-2 opens substantially vertically and the end 28-1 is primarily vertical but opens at an angle 32 relative to horizontal (i.e., level ground) that is between 45°-135° (i.e., no more than 45° from vertical). As used herein, "primarily vertical" or "primarily upright" means no more than 45° from vertical. In an alternative configuration, not specifically shown, the plug 24-1, 24-2 can be directly attached to the component 10 such as via a boss or port formed by the component 10 such that the plug 24-1, 24-2 is oriented primarily upright.

Returning the example provided, the plugs 24-1, 24-2 are configured to permit air to flow into and out of the ends 28-1, 28-2 of the hoses 20-1, 20-2. The hose 20-2 is directly connected to a port 36 on a housing 40 of the component 10 and permits the air to flow into and out of the interior of the housing 40. The hose 20-1 may be attached to a different port (not shown) on the component 10 or may be attached to a different component (not shown).

Referring to FIGS. 2 and 3, a vent system 210 according to the teachings of the present disclosure is illustrated. The vent system 210 includes a plug 214. The vent system 210 may optionally include a hose or tube similar to the hose 20-1, 20-2 (FIG. 1). As described in greater detail below, the plug 214 is generally configured to permit airflow into and out of a component (e.g., component 10 of FIG. 1) while inhibiting liquid flow into the component when the plug is in a primarily upright position and attached to the component (e.g., via a hose, tube, or direct port connection).

The plug 214 includes a main body 218 and a cap 222. In the example provided, the main body 218 is a unitarily formed part and the cap 222 is a separately unitarily formed part that is coupled to the main body 218 via interlocking features discussed in greater detail below, though other configurations can be used such as other types of interlocking features, adhesive, or metal or plastic welding for example. In one alternative form, not specifically shown, the main body 218 and the cap 222 may be unitarily formed as one part, such as via 3D printing for example. In another alternative form, the main body 218 may be more than one unitarily formed piece coupled together such as by interlocking features, adhesive, or metal or plastic welding for example. In the example provided, the plug 214 is a plastic material, though other types of materials may be used, such as metal or composites for example.

Returning to the example provided, the main body 218 includes a central tube 226 disposed about a central axis 228, and an outer wall 230 disposed about the central tube 226. In the example provided, the main body 218 may also include a lower tube 234 that is coaxially disposed about the central axis 228. In the example provided, the outer wall 230 is a generally cylindrical shape disposed coaxially about the central axis 228 and is also referred to herein as the outer tube, though other configurations can be used.

The main body 218 may also include a feature configured to retain a hose or tube (e.g., hose 20-1 or 20-2; FIG. 1) on the lower tube 234, such as barbs 238, though other types of features can be used. While two barbs 238 are illustrated, more or fewer barbs can be used.

Referring to FIG. 4, each barb 238 can have a ramp shape such that an insertion side 242 of the barb 238, i.e., a side that faces generally in the downward axial direction, increases its diameter with increased distance from a bottom end 246 of the lower tube 234 such that the hose (e.g., hose 20-1, 20-2; FIG. 1) can be easily slid onto the lower tube 234. A retention side 250 of the barb 238 faces generally in an upward direction to resist removal of the inserted hose (e.g., hose 20-1, 20-1; FIG. 1). In the example provided, the retention side 250 is perpendicular to the central axis 228 such that it forms an abrupt step from the widest part of the insertion side 242 to the outer surface of the lower tube 234, though other configurations can be used such as gradually ramping back to the lower tube 234 for example. In one alternative form, the lower tube 234 may be threaded instead of including the barbs 238 to threadably engage a mating part (not shown).

Referring to FIGS. 3 and 4, a bottom side 254 of the cap 222 defines an opening 258 having a diameter greater than the diameter of the central tube 226. A top side 262 of the cap 222 may optionally have a conical or frustoconical shape disposed about the central axis 228 with its base proximate to the main body 218 and narrowing with increased axial distance from the main body 218. The bottom side 254 may optionally have a frustoconical shape disposed about the central axis 228 with its base proximate to the base of the top side 262 and narrowing with increased axial distance from the top side 262.

Figure 5:
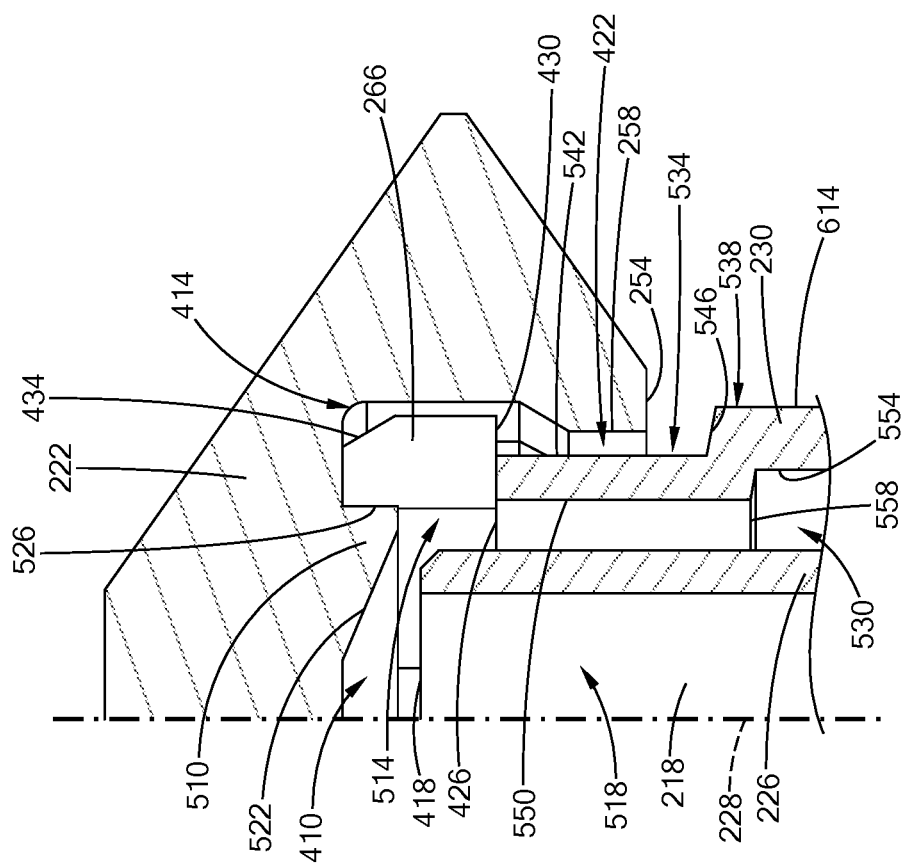
FIG. 5 is a cross-sectional view of a portion of the vent system of FIG. 2.
Figure 7:
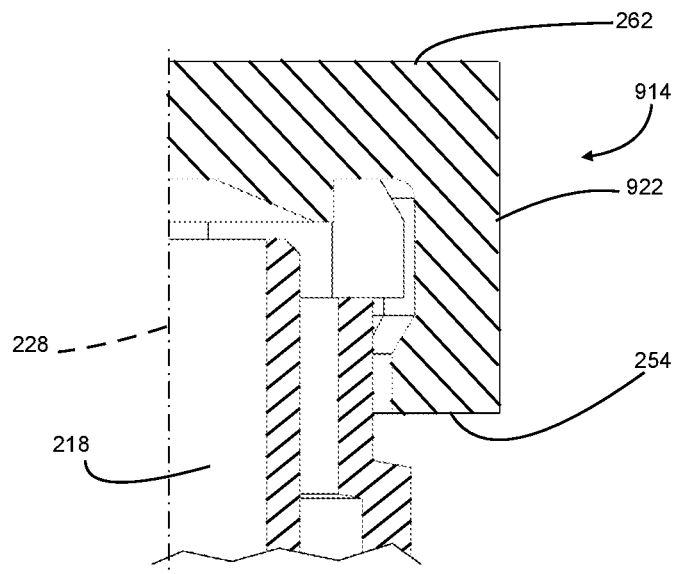
FIG. 7 is a cross-sectional view of a portion of a vent system of a second construction in accordance with the teachings of the present disclosure.
Figure 8:
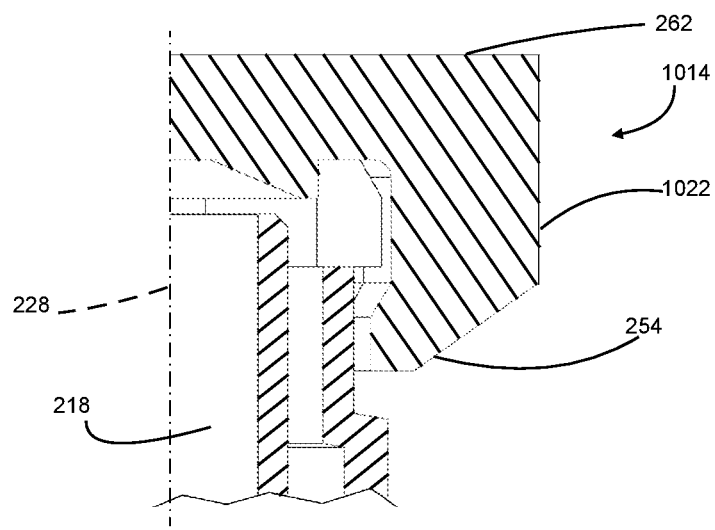
FIG. 8 is a cross-sectional view of a portion of a vent system of a third construction in accordance with the teachings of the present disclosure.

Referring to FIGS. 4 and 5, the cap 222 defines an interior cavity 410 open to the exterior of the cap 222 via the opening 258. With specific reference to FIG. 5, when assembled with the main body 218, the top of the main body 218 extends into the cavity 410 to cooperate with the cap to divide the cavity 410 into different regions. Specifically, the main body 218 and cap 222 cooperate to define a vent chamber 414. The vent chamber 414 can be generally annular in shape and can extend radially outward of the opening 258. The vent chamber 414 may also extend axially above a top end 418 of the central tube 226.

The opening 258 of the cap 222 at least partially defines one or more vent outlets 422 open to a bottom of the vent chamber 414. In the example provided, the outer wall 230 and the opening 258 cooperate to define the vent outlet 422 such that the vent outlet 422 has an annular shape disposed about the central axis 228, though other configurations can be used. In one alternative form, not specifically shown, the opening 258 can be a diameter similar to the outer diameter of the outer wall 230 and the bottom side 254 of the cap 222 can define a plurality of apertures radially outward of the opening 258 that are open to the vent chamber 414 and the exterior of the cap 222.

Referring to FIGS. 2 and 4, the main body 218 and cap 222 in the example provided may include interlocking features configured to couple the main body 218 to the cap 222. In the example provided, the main body 218 includes a plurality of hooks or fingers 266 that extend from a top end 426 of the outer wall 230 and are spaced apart from each other in the circumferential direction about the central axis 228.

Referring to FIG. 5, the fingers 266 include a shoulder 430 that extends radially outward of the top end 426 and radially outward of the opening 258. A top end of each finger 266 includes a ramped face 434 that narrows to a diameter that is less than that of the opening 258. The ramped faces 434 are configured to resiliently deflect the fingers 266 radially inward as the main body 218 is moved axially into the opening 258 until the fingers 266 resiliently snap radially outward once within the vent chamber 414. With the fingers 266 within the vent chamber 414, the shoulders 430 resist removal of the main body 218 from the cap 222.

Referring to FIGS. 4 and 5, the cap 222 can also define a deflector 510. With specific reference to FIG. 5, the deflector 510 cooperates with the top end 418 of the central tube 226 to define an upper vent passage 514 in fluid communication with the vent chamber 414 and a main vent passage 518 that is defined by the central tube 226. In this way, air escaping from the top end 418 of the central tube 226 can flow through the upper vent passage 514, into the vent chamber 414, and exit via the vent outlet 422. In the example provided, the main vent passage 518 is a cylindrical passage disposed about the central axis 228, though other configurations may be used.

A radially inward side 522 of the deflector 510 can have a ramped shape configured to direct airflow in a downward and radially outward direction through the upper vent passage 514. In the example provided, the radially inward side 522 of the deflector 510 is a conical or frustoconical shape disposed about the central axis 228 with its base proximate the central tube 226 and narrowing with increased axial distance from the central tube 226. The deflector 510 extends below the top of the vent chamber 414. The outer edge of the top end 418 of the central tube 226 may optionally be chamfered to further assist airflow through the upper vent passage 514. In the example provided, the deflector 510 does not extend below the top end 418 of the central tube 226. In an alternative form, not specifically shown, the deflector 510 can extend below the top end 418 of the central tube 226.

Returning to the example provided, a radially outward side 526 of the deflector 510 can be a cylindrical face that may be substantially parallel to the central axis 228, though other configurations can be used. The radially outward side 526 can have a diameter that is less than an inner diameter of the fingers 266.

The diameter of the radially outward side 526 is less than the outer diameter of the top end 426 of the outer wall 230. In the example provided, the diameter of the radially outward side 526 is less than the inner diameter of the top end 426 of the outer wall 230. This way, liquid that may splash into the vent chamber 414 can impinge on the radially outward side 526 and fall downward into a drain passage 530 defined by the central tube 226 and the outer wall 230. The upper vent passage 442 is also in fluid communication with the drain passage 530.

In the example provided, the drain passage 530 is an annular shaped passage radially between the central tube 226 and the outer wall 230. In an alternative form, not specifically shown, the main body 218 can define a plurality of individual drain passages 530 between the central tube 226 and the outer wall 230 that are spaced circumferentially about the central axis 228.

Figure 6:
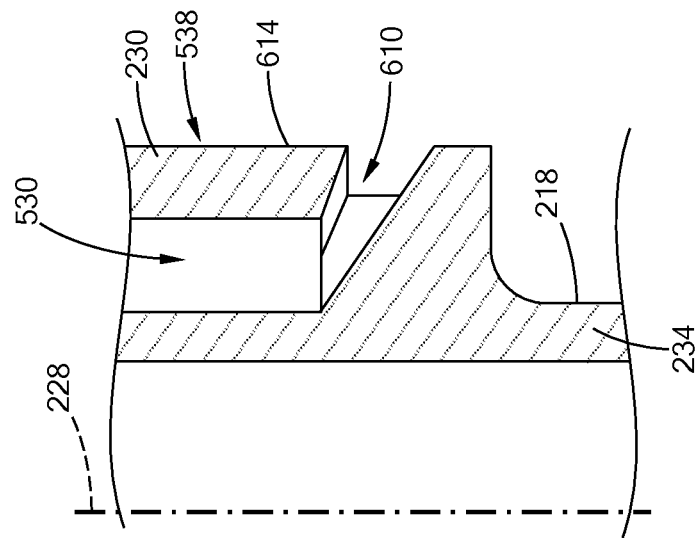
FIG. 6 is a cross-sectional view of a different portion of the vent system of FIG. 2.

Referring to FIGS. 5 and 6, the outer wall 230 has an upper portion 534 and a lower portion 538. With specific reference to FIG. 6, the lower portion 538 defines at least one drain outlet 610 open to an exterior of the main body 218. In the example provided, a plurality of drain outlets 610 are provided and are spaced apart in the circumferential direction about the central axis 228. In the example provided, the drain outlets 610 are equally spaced apart, though other configurations can be used.

In the example provided, the drain outlets 610 are open through a radially outer surface 614 of the lower portion 538, though other configurations can be used. In one alternative form, not specifically shown, the drain outlets 610 may be open through the bottom of the outer wall 230 between the lower tube 234 and the radially outer surface 614.

Returning to the example provided, the drain outlets 610 can be angled downward and radially outward so that gravity can cause liquid at the bottom of the drain passage 530 to flow out the drain outlets 610.

With specific reference to FIG. 5, the radially outer surface 614 of the lower portion 538 may optionally have a diameter that is greater than the diameter of a radially outer surface 542 of the upper portion 534 such that the outer wall 230 defines an exterior step 546 that extends radially inward from the radially outer surface 614 to the radially outer surface 542. The exterior step 546 may optionally be sloped downward and radially outward. The exterior step 546 is disposed below the opening 258. In the example provided, the radially outer surface 614 is disposed radially outward of the opening 258.

A radially inner surface 550 of the upper portion 534 may optionally have a diameter that is less than the diameter of a radially inner surface 554 of the lower portion 538 such that the outer wall 230 defines an interior step 558 that extends radially outward from the radially inner surface 550 to the radially inner surface 554. The interior step 558 may optionally be sloped downward and radially outward. In the example provided, the radially inner surface 554 is radially inward of the radially outer surface 542, though other configurations may be used.

Referring to FIG. 9, a plug 914 of an alternative form is illustrated. The plug 914 is similar to the plug 214 (FIGS. 2-6) except as otherwise shown or described herein. As such, similar features use similar reference numerals and only differences are described herein in detail. The plug 914 includes the main body 218 and a cap 922. The cap 922 is similar to the cap 222 except that the top side 262 and the bottom side 254 are substantially flat (i.e., substantially perpendicular to the central axis 228) instead of conical or frustoconical.

Referring to FIG. 10, a plug 1010 of yet another alternative form is illustrated. The plug 1014 is similar to the plug 214 except as otherwise shown or described herein. As such, similar features use similar reference numerals and only differences are described herein in detail. The plug 1014 includes the main body 218 and a cap 1022. The cap 1022 is similar to the cap 222 except that the top side 262 is flat instead of conical or frustoconical. In the example provided, the bottom side 254 of the cap 1022 is frustoconical.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vent device for venting a gas from a vehicle component, the vent device comprising:
    a main body including a central tube and an outer wall, the central tube defining a main vent passage disposed about a central axis, the outer wall being disposed about the central tube and cooperating with the central tube to define a drain passage radially therebetween, wherein the main body defines at least one drain outlet open to an exterior of the main body and open to a bottom of the drain passage; and
    a cap coupled to a top of the main body and cooperating with the main body to define a vent chamber, wherein the cap and a top portion of the central tube cooperate to define an upper vent passage, wherein the upper vent passage is in fluid communication with the vent chamber, the drain passage, and an outlet of the main vent passage, wherein a bottom portion of the cap at least partially defines a vent outlet radially outward of the drain passage, the vent outlet being open to the vent chamber and an exterior of the vent device,
    wherein the vent chamber extends radially outward of the vent outlet.

2. The vent device according to claim 1, wherein the main body includes a lower tube defining a lower vent passage in fluid communication with an inlet of the main vent passage, wherein an outer surface of the lower tube defines at least one barb configured to permit the lower tube to be inserted into a hose while inhibiting removal of the lower tube from the hose.

3. The vent device according to claim 1, wherein the outer wall includes an upper portion and a lower portion, the upper portion of the outer wall cooperating with the central tube to define an upper region of the drain passage, the lower portion of the outer wall cooperating with the central tube to define a lower region of the drain passage, the lower region extending radially outward of the upper region.

4. The vent device according to claim 1, wherein the outer wall includes an upper portion and a lower portion, the upper portion cooperating with the cap to define the vent outlet, wherein an outer surface of the lower portion is radially outward of the vent outlet.

5. The vent device according to claim 1, wherein an inlet of the drain passage is axially below an outlet of the upper vent passage.

6. The vent device according to claim 1, wherein the main body includes a plurality of fingers, each finger having a ramp side and a retention side, the ramp side being configured to guide the finger into the vent chamber by pressing the cap axially toward the main body and the retention side being configured to inhibit removal of the finger from the vent chamber.

7. The vent device according to claim 1, wherein each drain outlet of the at least one drain outlets is angled downward and radially outward.

8. The vent device according to claim 1, wherein the cap includes a vent deflector that has a deflector surface that faces toward the outlet of the main vent passage, wherein, with increased radial distance from the central axis, the deflector surface extends further in an axial direction toward the outlet of the main vent passage, wherein the deflector surface extends radially outward of at least part of the top portion of the central tube to cooperate with the top portion of the central tube to define the upper vent passage.

9. The vent device according to claim 8, wherein a top of the vent chamber extends above an outlet of the upper vent passage.

10. The vent device according to claim 1, wherein the at least one drain outlet includes a plurality of drain outlets.

11. The vent device according to claim 10, wherein the plurality of drain outlets are symmetrically distributed in a circumferential direction about the central axis.

12. The vent device according to claim 1, wherein a top portion of the cap tapers radially inward relative to the central axis with increased axial distance from the main body.

13. The vent device according to claim 12, wherein the bottom portion of the cap tapers radially inward relative to the central axis with increased axial distance from the top portion of the cap.

14. The vent device according to claim 12, wherein the top portion of the cap is conical or frustoconical in shape and coaxial with the central axis.

15. The vent device according to claim 14, wherein the bottom portion of the cap is frustoconical in shape and coaxial with the central axis, the frustoconical shape of the bottom portion tapering radially inward with increased axial distance from the top portion of the cap.

16. A vent device for venting a gas from a vehicle component, the vent device comprising:
   a main body including a central tube and an outer tube, the central tube defining a main vent passage disposed about a central axis, the outer tube being disposed coaxially about the central tube and cooperating with the central tube to define an annular drain passage radially therebetween, wherein the main body defines at least one drain outlet open to an exterior of the main body and open to a bottom of the drain passage; and
   a cap coupled to a top of the main body and cooperating with the main body to define a vent chamber, wherein the cap and a top portion of the central tube cooperate to define an upper vent passage in fluid communication with the vent chamber, the drain passage, and an outlet of the main vent passage, wherein a bottom portion of the cap at least partially defines a vent outlet radially outward of the drain passage, the vent outlet being open to the vent chamber and an exterior of the vent device,
   wherein the outer tube includes an upper portion and a lower portion, the upper portion cooperating with the cap to define the vent outlet, wherein an outer surface of the lower portion is radially outward of the vent outlet.

17. The vent device according to claim 16, wherein the vent chamber extends radially outward of vent outlet.

18. The vent device according to claim 17, wherein the cap includes a vent deflector that has a deflector surface that faces toward the outlet of the main vent passage, wherein, with increased radial distance from the central axis, the deflector surface extends further in an axial direction toward the outlet of the main vent passage, wherein the deflector surface extends radially outward of at least part of the top portion of the central tube to cooperate with the top portion of the central tube to define the upper vent passage, wherein a top of the vent chamber extends above an outlet of the upper vent passage.

19. A vent device for venting a gas from a vehicle component, the vent device comprising:
   a main body including a central tube and an outer wall, the central tube defining a main vent passage disposed about a central axis, the outer wall being disposed about the central tube and cooperating with the central tube to define a drain passage radially therebetween, wherein the main body defines at least one drain outlet open to an exterior of the main body and open to a bottom of the drain passage; and
   a cap coupled to a top of the main body and cooperating with the main body to define a vent chamber, wherein the cap and a top portion of the central tube cooperate to define an upper vent passage, wherein the upper vent passage is in fluid communication with the vent chamber, the drain passage, and an outlet of the main vent passage, wherein a bottom portion of the cap at least partially defines a vent outlet radially outward of the drain passage, the vent outlet being open to the vent chamber and an exterior of the vent device,
   wherein the outer wall includes an upper portion and a lower portion, the upper portion of the outer wall cooperating with the central tube to define an upper region of the drain passage, the lower portion of the outer wall cooperating with the central tube to define a lower region of the drain passage, the lower region extending radially outward of the upper region.

* * * * *